(12) United States Patent
Yu et al.

(10) Patent No.: US 7,570,795 B2
(45) Date of Patent: Aug. 4, 2009

(54) MULTI-REGION AUTOFOCUS TOOL AND MODE

(75) Inventors: Dahai Yu, Redmond, WA (US); Barry Eugene Saylor, Kent, WA (US); Ana M. Tessadro, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 576 days.

(21) Appl. No.: 11/489,030

(22) Filed: Jul. 18, 2006

(65) Prior Publication Data

US 2008/0019683 A1  Jan. 24, 2008

(51) Int. Cl.
*G06K 9/00* (2006.01)
(52) U.S. Cl. ............... 382/141; 382/145; 382/152; 348/86; 348/92
(58) Field of Classification Search ........... 382/141, 382/142, 143, 145, 147, 152; 348/86, 87, 348/92
See application file for complete search history.

(56) References Cited

U.S. PATENT DOCUMENTS

| 4,000,417 | A | * | 12/1976 | Adkisson et al. ......... 250/201.4 |
| 6,542,180 | B1 | | 4/2003 | Wasserman |
| 6,711,283 | B1 | * | 3/2004 | Soenksen ................... 382/133 |
| 6,800,249 | B2 | * | 10/2004 | de la Torre-Bueno ......... 422/63 |
| 6,917,696 | B2 | * | 7/2005 | Soenksen ................... 382/128 |
| 6,922,652 | B2 | * | 7/2005 | Edwards et al. ............. 702/128 |
| 2005/0031191 | A1 | | 2/2005 | Venkatachalam |
| 2005/0213807 | A1 | | 9/2005 | Wasserman |
| 2006/0093205 | A1 | | 5/2006 | Bryll |

OTHER PUBLICATIONS

"QVPAK 3D CNC Vision Measuring Machine Operation Guide," Mitutoyo Corporation & Micro Encoder Inc., Kanagawa, Japan, Sep. 1996.
"QVPAK 3D CNC Vision Measuring Machine User's Guide Version 7," Mitutoyo Corporation & Micro Encoder Inc., Kanagawa, Japan, Jan./Sep. 2003.

* cited by examiner

*Primary Examiner*—Yosef Kassa
(74) *Attorney, Agent, or Firm*—Christensen O'Connor Johnson Kindness PLLC (57) ABSTRACT

A system and method are provided for a "multi-region" autofocus video tool-type or mode within a machine vision inspection system. The user may efficiently define multiple regions of interest that are grouped as a "multi-region" set. The autofocus operations for the multi-region set are defined with a shared set of autofocus parameters. The same set of autofocus images may be used for the autofocus operations of the multi-region set. The user may conveniently also define individual autofocus regions of interest, defined with individual autofocus parameters, within the same field of view. Various user interface features allow a user to conveniently change between the individual autofocus tool-type or mode and the multi-region autofocus tool-type or mode.

19 Claims, 7 Drawing Sheets

MULTI-REGION AUTOFOCUS TOOL AND MODE

FIELD OF THE INVENTION

The invention relates generally to machine vision inspection systems and, more particularly, to video metrology tool modes and tools usable to define inspection operations for such systems.

BACKGROUND OF THE INVENTION

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) may be used manually to accomplish manual inspection and/or machine control operations. Their set-up parameters and operation can also be recorded during learn mode, in order to create automatic inspection programs, or "part programs." Such tools may include, for example, edge/boundary detection tools, autofocus tools, shape or pattern matching tools, dimension measuring tools, and the like. For example, such tools are routinely used in a variety of commercially available machine vision inspection systems, such as the QUICK VISION® series of vision systems and the associated QVPAK® software, discussed above.

The currently available features and graphical user interface (GUI) controls for video tools, and particularly dimensional metrology video tools, are limited. In particular, alternatives for setting up video tool regions of interest (ROIs) and operating parameters during learn mode, or manual mode, are limited. Existing alternatives may be difficult to adapt for efficient use with different applications or workpieces. Existing user interfaces may be difficult for users to understand intuitively, making user learning and retention difficult. Video tools that overcome these and other disadvantages, to allow more efficient, intuitive, and flexible use of precision machine vision inspection systems, would be desirable.

SUMMARY OF THE INVENTION

Currently, the users of precision machine vision inspection systems may spend a majority of their part-programming time setting up video tools and adjusting their parameters. Thus, even small improvements in their ease-of-use in comparison to their parameter customization capability, their GUI features, and other ergonomic factors, may be highly valued. In addition, even in small improvements inspection throughput are highly valued in industrial environments. Accordingly, the present invention is directed toward a novel and efficient "multi-region" autofocus video tool mode for configuring a multi-region autofocus video tool in an easy-to-use and flexible manner. In addition, the resulting multi-region autofocus tool may generally be operated to provide increased throughput compared to a conventional autofocus tool.

According to one feature of the invention, a system and method are provided which allow users to define and/or edit tool parameters for a plurality of autofocus ROIs with a reduced number of operations. The plurality of ROIs may be readily configured by the user to have different sizes, and/or overlap each other, etc. In one embodiment, these new video tool methods may be implemented as an alternative multi-region tool-type, or "tool mode," that, along with a conventional tool-type, or mode, gives users a high level of control over autofocus tool set-up and operation alternatives with a simple and intuitive user interface.

According to one feature of the invention a multi-region set of autofocus ROIs may be defined and/or displayed while operating in a multi-region autofocus "tool mode." According to one feature of the invention, each member ROI in the multi-region set of autofocus ROIs may be governed by the same combination of autofocus operation parameters.

According to one feature of the invention, an indication of the ROIs of one or more multi-region sets may be displayed superimposed on the image of a portion of a workpiece that is located in the field of view of the machine vision inspection system. The indication of the ROIs belonging to the multi-region set may be displayed at least while defining the members of a multi-region set, when adding a new member, or when editing a member of the set.

According to one feature of the invention, the indication of the member ROIs, and/or the operation of the multi-region tool mode in general, may be provided by displaying at least one line linking the ROIs of a multi-region set, by displaying the member ROIs in the same color, by displaying the member ROIs with a similar line type, or by drawing a boundary around the multi-region set, or the like.

According to various features of the invention, a new multi-region set of ROIs may be defined and/or displayed when the user selects (or continues in) the multi-region autofocus tool mode of operation as the current mode of operation and defines a first member ROI of the new multi-region set. The user may then define a second member ROI while the current mode of operation is the multi-region autofocus tool mode. The user may also interrupt the multi-region autofocus tool mode and perform an operation unrelated to this mode. The user may subsequently resume the multi-region autofocus tool mode and define an additional member of the set.

According to one feature of the invention, the user may toggle the multi-region autofocus tool mode "on" by toggling the mode button, or by simply selecting a member of an existing multi-region autofocus set. The user may subsequently define an additional member of that set, revise its operating parameters, etc.

According to one feature of the invention, the user may toggle the multi-region autofocus tool mode "off" by toggling the mode button, or by simply selecting the ROI of an existing individual mode autofocus tool, or another type of video tool. The user may subsequently revise the operating parameters of the individual mode autofocus ROI, or other tool, or perform other operations as desired.

According to one feature of the invention, "autofocus" operations to determine the respective Z-coordinates associated with the respective ROIs of a multi-region set may include acquiring a set of images over a Z-height search range that is estimated or defined to include a plurality, or all, of the expected Z-height values corresponding to the multi-region set. The set of images may be acquired during continuous motion over the Z-height search range. A plurality, or all, of the set of images may be analyzed to determine the Z-height for each respective ROI. The analysis may begin before the set of images is complete, if desired. The search range may be set to a default range, or defined by a user, or defined based on operations during learn mode (e.g., based on the Z-height positions used while defining a multi-region set, or by one or more automatic autofocus operations, or the like). A default range may be determined based at least partially on a current optical configuration.

According to one feature of the invention, the user interface may provide one or more means for the user to select an ROI of a multi-region set for editing, whereby the user may modify the location and dimensions of the ROI, define an estimated Z-height to be associated with that ROI, or the like.

According to one feature of the invention, a user may select an accuracy level for the autofocus calculations associated with multi-region set. This may be advantageous because the higher accuracy levels require the images used for autofocus analysis to be more closely spaced, and may require more calculations. Thus, if the user judges that lower accuracy levels are sufficient, the throughput may be increased.

According to one feature of the invention, the user interface may provide the user with a plurality of autofocus measurement options for a multi-region set. In a first option, a Z-height value may be determined for each ROI in a multi-region set. This provides information that the user of the machine vision inspection system may use to adjust the machine to a Z-position that matches the Z-height value of any selected member of the multi-region set, or may simply allow the output of any or all of the Z-height values as measurement values. In a second option, the maximum Z-height value may be determined among the set of ROIs. The machine vision inspection system may then be adjusted to a Z-position that matches the maximum Z-height value, or may simply return the maximum Z-height value as a measurement value. In a third option, the minimum Z-height value may be determined among the set of ROIs. The machine vision inspection system may then be adjusted to a Z-position that matches the minimum Z-height value, or may simply return the minimum Z-height value as a measurement value. Additional options may include determining the (maximum-minimum) difference value, or average Z-height value, etc.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings, wherein.

DETAILED DESCRIPTION OF THE PREFERRED EMBODIMENT

Figure 1:
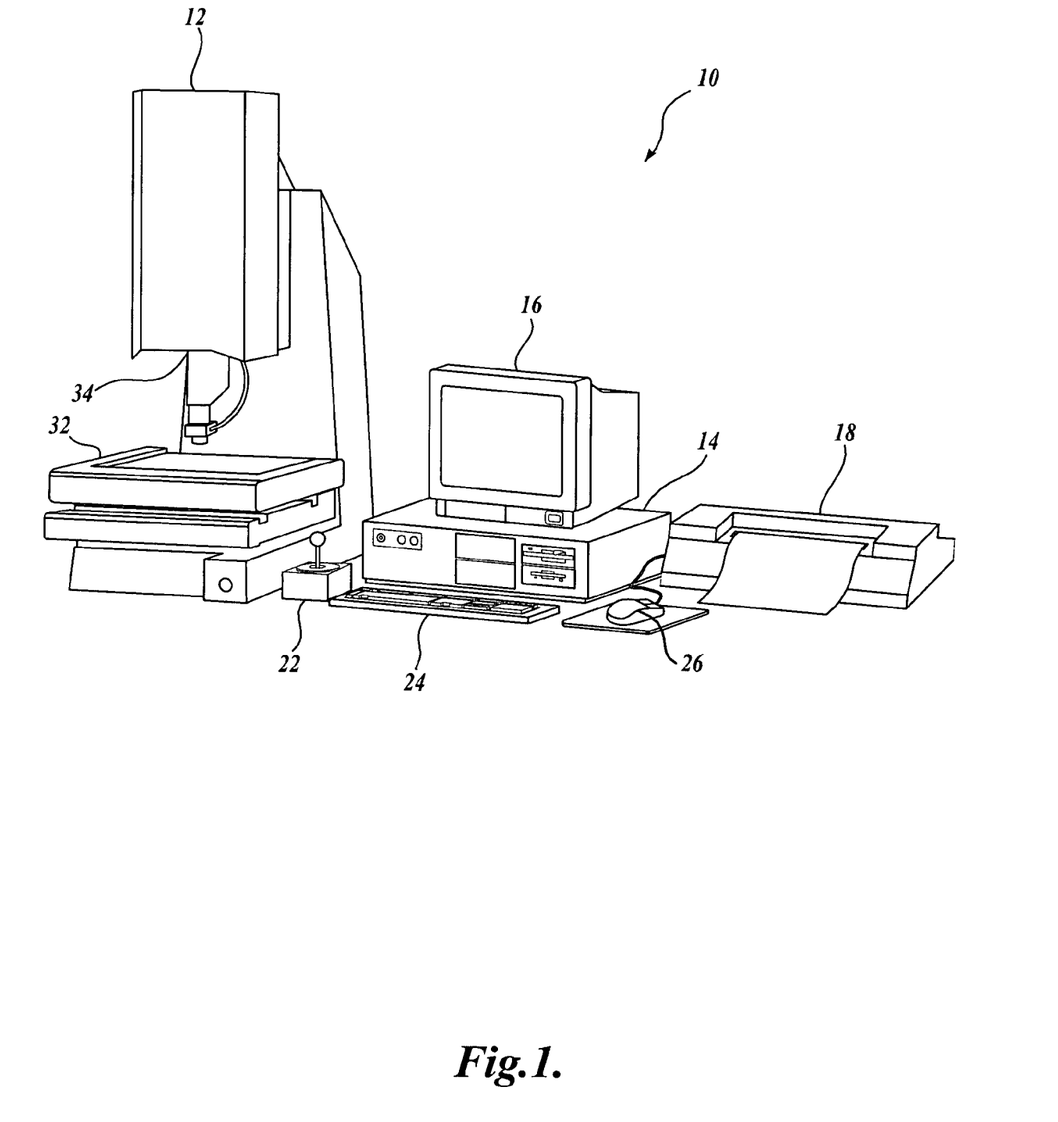
FIG. 1 is a diagram showing various typical components of a general purpose machine vision inspection system.

FIG. 1 is a block diagram of one exemplary machine vision inspection system 10 usable in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in copending and commonly assigned U.S. patent application Ser. No. 10/978,227, which is hereby incorporated herein by reference in its entirety. Various aspects of vision measuring machines and control systems are also described in more detail in copending and commonly assigned U.S. patent application Ser. Nos. 10/808,948, filed Mar. 25, 2004, and Ser. No. 10/632,823, filed Aug. 4, 2003, which are also hereby incorporated herein by reference in their entirety. As previously indicated, the users of such general purpose precision machine vision inspection systems are often occasional and/or inexperienced users. Such users may spend a majority of their programming time refreshing their understanding of video tools, setting up their ROIs, adjusting their parameters, etc. Thus, even small improvements in the intuitiveness of their graphical user interface and/or their overall ease-of-use, in comparison to their parameter customization capability, their user interface options, and other ergonomic factors, may be highly valued.

Figure 2:
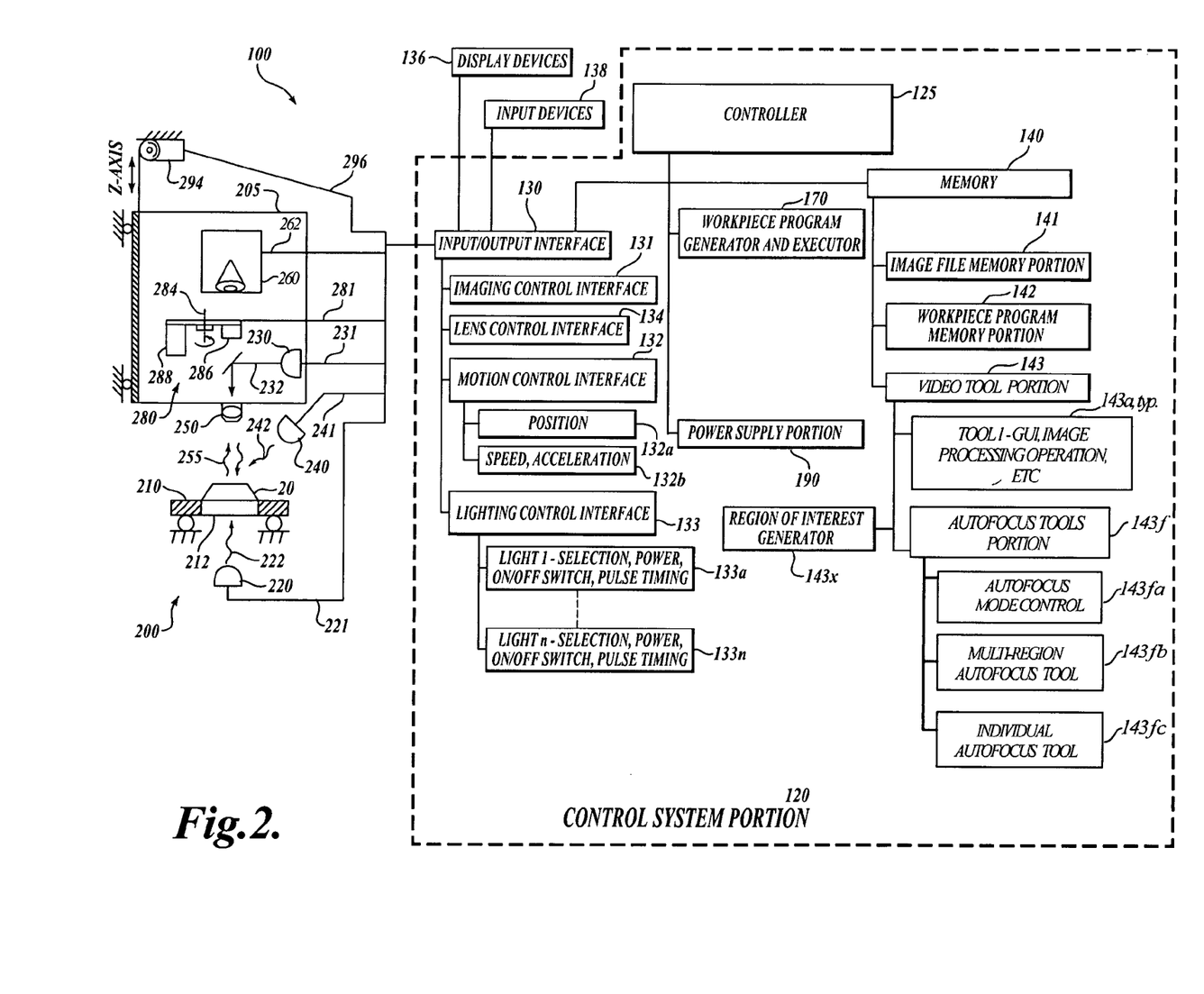
FIG. 2 is a diagram of a control system portion and a vision components portion of a machine vision inspection system.

FIG. 2 is a diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294, as described further below.

A workpiece 20 that is to be imaged using the machine vision inspection system 100 is placed on the workpiece stage 210. One or more of a stage light 220, a coaxial light 230, and a surface light 240 may emits source light 222, 232, or 242, respectively, to illuminate the workpiece 20. The source light is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120. The light sources 220, 230, and 240 may be connected to the control system portion 120 through signal lines or busses 221, 231, and 241, respectively.

When it is included in the optical assembly portion 205, the turret lens assembly 280 may include at least a first turret lens position and lens 286 and a second turret lens position and lens 288. To alter the image magnification, the control system portion 120 may rotate the turret lens assembly 280 along axis 284, between at least the first and second turret lens positions, through a signal line or bus 281.

In various exemplary embodiments, the optical assembly portion 205 is movable in the vertical Z axis direction relative to the workpiece stage 210 using a controllable motor 294 that drives an actuator, a connecting cable, or the like, to move the optical assembly portion 205 along the Z axis to change the focus of the image of the workpiece 20 captured by the camera system 260. The term Z axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, and a power supply portion 190. It will be appreciated that each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 includes a position control element 132a, and a speed/acceleration control element 132b. However, it should be appreciated that in various exemplary embodiments, such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100, such as the light sources 220, 230, and 240.

The memory 140 includes an image file memory portion 141, a workpiece program memory portion 142 that may include one or more part programs, or the like, and a video tool portion 143. The video tool portion 143 includes tool portion 143a, and other similar tool portions (not shown), which determine the GUI, image processing operation, etc., for each of the corresponding tools. The video tool portion 143 also includes a region of interest generator 143x that supports automatic, semi-automatic and/or manual operations that define various ROIs that are operable in various video tools included in the video tool portion 143.

In particular, in various embodiments according to this invention, the video tool portion 143 includes the autofocus tools portion 143f, which provides various operations and features related to multi-region autofocus operations, as described in greater detail below. In one embodiment, the autofocus tools portion 143f may include an autofocus mode control 143fa, a multi-region autofocus tool 143fb, and an individual autofocus tool 143fc. Briefly, the individual autofocus tool 143fc performs operations associated with a single autofocus ROI, and may operate similarly to known autofocus tools. The multi-region autofocus tool 143fb performs operations associated with a multi-region set of ROIs as disclosed herein, and may be configured and operated more efficiently than previously known autofocus tools. The autofocus mode control 143fa performs operations, as disclosed herein, to determine which of the autofocus tools (that is the multi-region autofocus tool 143fb or the individual autofocus tool 143fc) or tool modes is activated.

It should be appreciated that alternative configurations are possible for the autofocus tools portion 143f. For example, the multi-region autofocus tool 143fb, and the individual autofocus tool 143fc may include mode control functions such that a separate mode control portion 143fa may be omitted. Alternatively, the autofocus tools portion 143f may provide one or more generic autofocus tool elements, and the mode control portion 143fa may provide operations that govern the user interface and interrelationships of the generic autofocus tool elements in a manner the depends on whether multi-region autofocus tool behavior, or individual autofocus tool behavior, is desired. In such a case, the circuits, routines, or applications that provide the operations of the multi-region autofocus tool 143fb, and/or the individual autofocus tool 143fc, may be merged and/or indistinguishable. More generally, this invention may be implemented in any now known or later-developed form that is operable in conjunction with the machine vision inspection system 100 to provide the features disclosed herein in relation to the multi-region autofocus operations.

In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130. The memory portion 140 also contains data defining a graphical user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more input devices 138 can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. In a fully automated system having a predefined part program (or workpiece program), the display devices 136 and/or the input devices 138 may be omitted.

In various exemplary embodiments, when a user utilizes the machine vision inspection system 100 to create a workpiece image acquisition program for the workpiece 20, the user generates workpiece program instructions either by explicitly coding the instructions automatically, semi-automatically, or manually, using a workpiece programming language, or by generating the instructions by moving the machine vision inspection system 100 through an image acquisition training sequence, setting light levels and the like, such that the workpiece program instructions capture the training sequence. This process is repeated for multiple images in a set of images that are to be captured. These instructions, when executed, will cause the machine vision inspection system to manipulate the workpiece stage 210 and/or the camera system 260 at certain speed(s) such that a particular portion of the workpiece 20 is within the field of view of the camera system 260 and at a desired focus state for each of a set of images to be acquired.

Once a set of workpiece image acquisition instructions are defined, the control system 120 executes the instructions and commands the camera system 260 to capture one or more images of the workpiece 20 according to the instructions. The control system 120 will then, under control of the controller 125, input the captured image(s) through the input/output interface 130 and store the captured image(s) in the memory 140. The controller 125 may also display the captured images on the display device 136.

The control system portion 120 is further usable to recall captured and stored workpiece inspection images, to inspect and analyze workpiece features in such workpiece inspection images, and to store and/or output the inspection results. These analysis and inspection methods are typically embodied in various video tools included in the video tool portion 143 of the memory 140, including the autofocus tools 143fb and 143fc. Many exemplary tools are included in commercially available machine vision inspection systems, such as the QUICK VISION® series of vision systems and the associated QVPAK® software, discussed above. After the image inspection/analysis operations using one or more of these video tools are completed, the control system 120 outputs the results of each analysis/inspection operation to the input/output interface for outputting to various display devices 136, such as a video display, printer, and the like. The control system 120 may also store the results of each inspection operation in the memory 140.

Figure 3A:
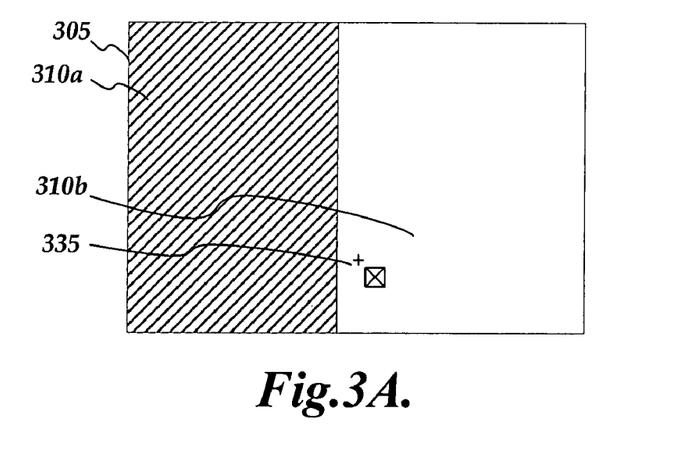
FIGS. 3A-3D are diagrams illustrating various features of one embodiment of a multi-region autofocus tool user interface including a field of view display.

FIGS. 3A-D are diagrams illustrating various features of one embodiment of a multi-region autofocus tool user interface 300 according to this invention. The corresponding multi-region autofocus tool may also be referred to as the multi-region autofocus tool 300, and the meaning will be clear from the context. FIG. 3A shows the displayed image of a field of view (FOV) 305 containing two workpiece surfaces 310a and 310b, which are located at different Z-heights, and a schematically represented tool indicator/cursor 335.

In operation, an exemplary tool mode referred to as a "multi-region autofocus tool mode" herein, may be activated when the tool-type icon and/or the multi-region autofocus tool/mode icon on a video tool bar is selected, as described below with reference to FIGS. 5A-5D. A multi-region autofocus tool indicator/cursor 335, as shown in FIG. 3A, may then appear on the displayed FOV 305. The multi-region autofocus tool indicator/cursor 335 may include a "multi-region symbol" associated with a cursor, and/or a conventional cursor, which may appear as a cross-hair or the like, at a "cursor point." The cursor point may provide coordinates that are used by the multi-region autofocus tool to the define the parameters of the member ROIs of the multi-region set of autofocus ROIs, as described in greater detail below. In general, for the various tools shown and described herein, a multi-region autofocus tool indicator/cursor may continue to appear in a display at a cursor point throughout various operations described herein, even if it is omitted from a figure in order to more clearly illustrate other features of the figure.

Throughout this disclosure, an ROI and its corresponding user interface ROI indicating box may be referred to interchangeably. For example, the element marked 320 in FIGS. 3B-3D may be referred to as the ROI 320 and/or as the ROI indicating box 320, and the meaning in each instance will be clear based on context.

Unless otherwise indicated by description or context, throughout this disclosure, "placing a point" may generally comprise the user entering the coordinates of a desired point, to be used by a multi-region autofocus tool for determining one or more autofocus tool parameters (e.g., the location and size of an autofocus ROI). In exemplary embodiments, the user may generally move an input device, such as a mouse, joystick, trackball, or the like, to move the indicator/cursor 335 around on a display of a workpiece feature such as the surfaces 310a and 310b. When the user has positioned the cursor at a desired position, the user may then click an input device button, or press "enter" on a keyboard, or the like, in order to "place a point" at the desired position. Placing a point may anchor a tool parameter indicator at the position of the placed point, as described below.

The term "parameter indicators" is used herein to refer to the graphical features of the user interface of an autofocus tool, or an autofocus tool GUI, that correspond to the current user-determined, or machine determined or derived, or default tool parameters. For example, for the ROI 320, the parameter indicators shown in FIGS. 3B-3D may include the upper end, lower end, and sides of the ROI indicator box 320. At various times, the cursor display may be merged with, or indistinguishable from, various parameter indicators of the autofocus tool GUI. This might alternatively be described, or implemented, as using the cursor as a parameter indicator in the GUI at various times, or as the cursor representation changing to indicate various parameters, or as the various parameter indicators "following" the cursor. All of these descriptions may fall within the scope of this invention, if they serve to implement the various features and operations of the invention outlined herein.

Figure 3B:
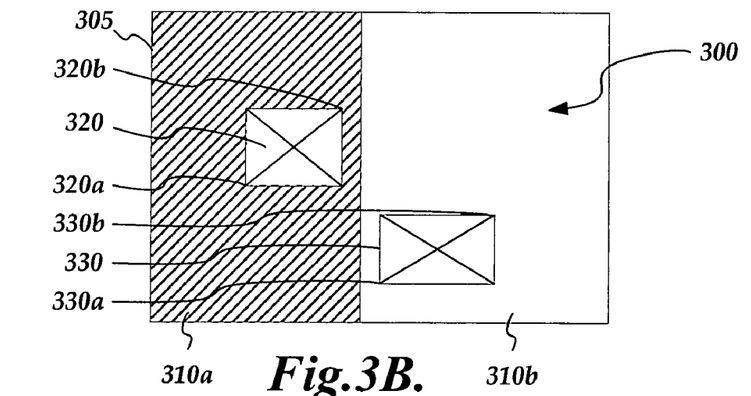
Figure 3C:
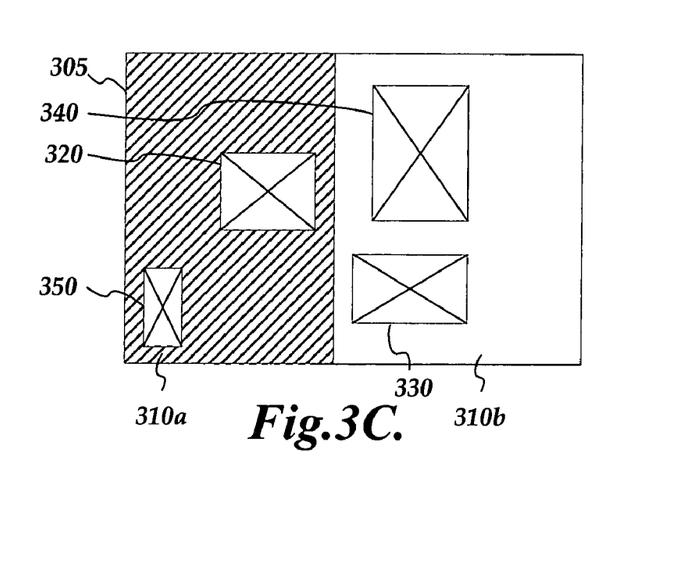

FIG. 3B, shows a first member ROI 320, and a second member ROI 330 of a multi-region set of autofocus ROIs, which may be defined according to the following operations, while the multi-region autofocus tool mode is active. The user initially places a point at a desired position 320a, which defines the coordinates of one corner of the ROI 320. After placing that point, a parameter indicator, such as a crosshair or a corner or side of the ROI indicating box 320, may be anchored at the point, and the user may then continue to move the indicator/cursor 335, which, in some embodiments, may be connected to the parameter indicator anchored at location 320a by the outline of a dynamic ROI indicating box 320. To complete the definition of the ROI 320 as shown in FIG. 3B, the user has moved the indicator/cursor 335 and placed a second point at a location 320b, which defines the other corner of the ROI 320. Similarly, to define the ROI 330 as shown in FIG. 3B, the user has placed a point at a location 330a, which anchors a first corner of the ROI 330 and subsequently placed a point at a location 330b, to complete definition of the member ROI 330. Continuing as shown in FIG. 3C, the user may define additional members of the multi-region set of ROIs, such as the ROIs 340 and 350 using operations similar to those described for the ROIs 320 and 330. In the example shown in FIGS. 3B-3D, the member ROIs 320-350 will determine autofocus Z-heights coinciding with their various areas on the surfaces 310a and 310b.

Figure 3D:
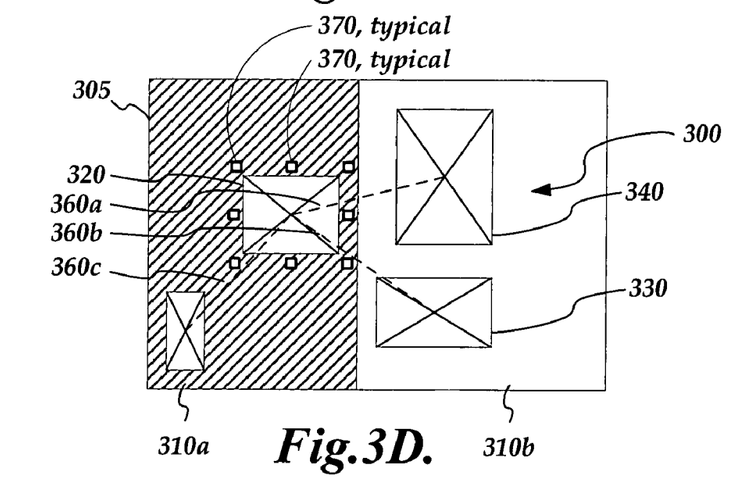

In various embodiments it is not necessary that each corresponding surface area is in focus while defining the various member ROIs 320-350. However, in some embodiments, the user interface may include a feature that allows a user to indicate that at least one of the ROIs is in focus at the time that it is defined, and the corresponding Z-height may then automatically be used in establishing the Z-height search range that is used for performing the multi-region autofocus operations described further below. For example, the Z-height corresponding to a focused ROI may be used as the middle of a Z-height search range that is determined based on a current optical configuration of the machine. In some embodiments, if different Z-height positions are used when various member ROIs are defined, then in some embodiments the multi-region autofocus tool may automatically assume that the different Z-heights are each useful focus heights, and the Z-height search range may be automatically defined (e.g., by a default procedure) such that each of the different Z-height positions is included within the Z-height search range.

FIG. 3D, shows an exemplary user interface configuration resulting from the user selecting one of the completed member ROIs of a multi-region set, in this case the ROI 320, for editing. Editing of a multi-region set may be initiated be selecting one of the members of the multi-region set, for example by positioning the cursor within a member ROI and clicking or double-clicking a mouse button, or the like. This may be done while the multi-region autofocus tool mode is either active or inactive. If it is inactive, then in some embodiments it may be automatically made active. In some embodiments this may be automatically reflected in the state of the multi-region autofocus tool/mode button (described further below) if it is visible, and/or in the appearance of the multi-region mode indicator/cursor. In various embodiments, when a member of a multi-region set is selected for editing, a set of size/location editing handles 370 may be displayed along the corners and sides of the selected ROI indicating box, as shown for the selected ROI 320. In addition, a set of set identification lines may be displayed connecting the various member ROIs that are included in the same set as the selected ROI, as exemplified by the set-identification lines 360a, 360b and 360c. In various other embodiments, such set identification lines may be displayed not only when a member ROI is selected for editing, but "continuously" whenever a second or later member of a set is under construction and/or completed. However, in various embodiments, to avoid cluttering the display "continuous" automatic set identification lines may be omitted or their display may depend on the user selecting that behavior through a user interface dialog box button, check box, or the like. The set identification lines provide an intuitive indicator to alert a user that edited autofocus parameters (other than the size or location of the selected ROI) will be applicable to autofocus operations for all members of the multi-region set.

After all parameters of the multi-region autofocus tool 300 are set to the satisfaction of the user, the tool may be run to automatically teach or train the tool, and/or to provide manual inspection results. The user may then accept the training results and continue to other operations, or reject the training results, further modify the tool parameters, and retrain the tool until satisfactory results are achieved. When results are satisfactory, the ROI parameters of the members of the multi-region set, and associated trained tool parameters for the set, may be recorded in a part program according to known methods.

In various embodiments, if the creation of a multi-region set is interrupted by the user selecting an incompatible tool, or an ROI not included in the a multi-region set, or the like, then when the multi-region autofocus mode is resumed, new ROIs may be added to the same multi-region set, by default. In various embodiments, a multi-region set can be "closed" or finished by running or "training" the multi-region autofocus tool for that multi-region set. Subsequently, new ROI's created in the multi-region autofocus mode will form a new multi-region set. However, if the user then selects a member of the "closed" multi-region set, then additional ROIs may subsequently be added to that set until it is again "closed" by running or training.

Figure 4A:
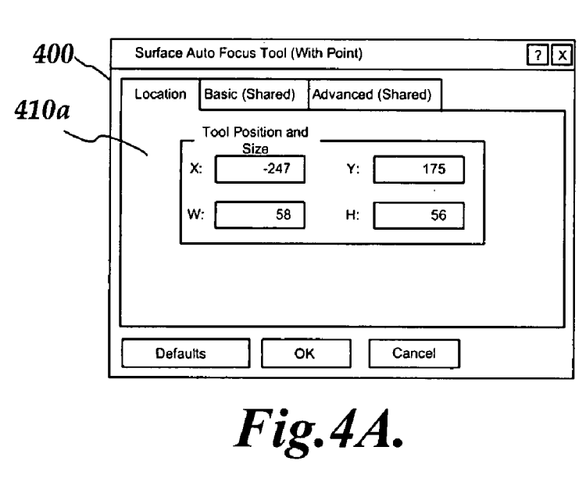
FIGS. 4A-4C are diagrams illustrating various features of one embodiment of a multi-region autofocus tool user interface including a tool parameter editing dialog box.
Figure 4B:
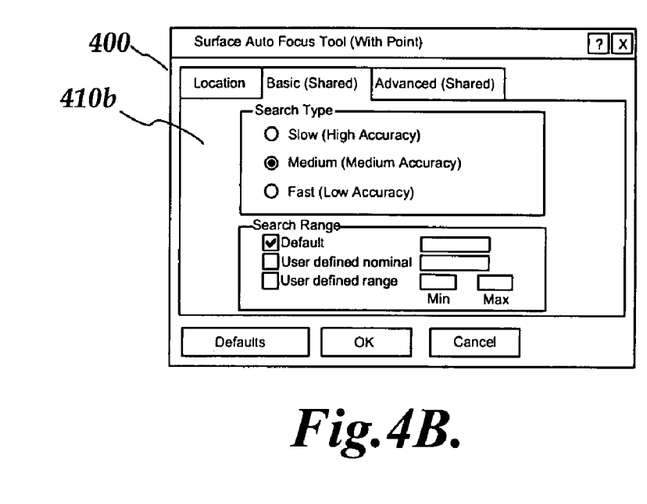
Figure 4C:
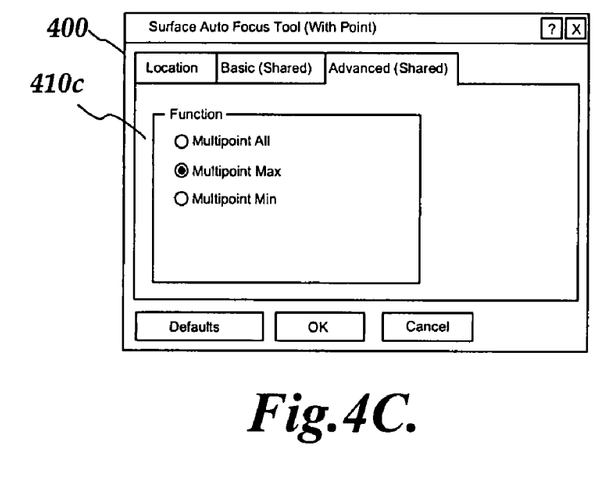

FIGS. 4A-4C are diagrams illustrating various features of one embodiment of a multi-region autofocus tool user interface including an autofocus parameter dialog box 400. In various embodiments, when the user selects a member ROI of a multi-region set (e.g., for editing), an autofocus parameter dialog box may be displayed. In one embodiment a tabbed dialog box configuration may be used, such as the autofocus parameter dialog box 400, which includes user-selectable tabbed portions 410a, 410b and 410c. FIG. 4A illustrates the tabbed portion 410a, which may reflect the X and Y center coordinates, as well as the width (W), height (H), and orientation of the selected ROI. These values may be determined by graphical definition of the ROI as previously described, and/or they may be entered directly in the dialog box.

FIG. 4B illustrates tabbed portion 410b, which reflects the search type to be employed for all of the members of the multi-region set that includes the selected ROI. In various embodiments, the search type may be altered for all members of a multi-region set whenever it is altered for one of the members. The search type allows the user to select a desired tradeoff between the speed and accuracy of autofocus operations, which may influence the spacing between autofocus images, the number of pixels and data points used to determine a focus curve, and the like. One of the search types may be used as a default search type, unless the user enters a different selection.

The tabbed portion 410b may also allow the user to influence the determination of the Z-height search range that is used for autofocus operations for the multi-region set. As previously outlined, multi-region autofocus tool operations may provide high efficiency and throughput by acquiring a single shared set of images distributed along a Z-height search range that includes the respective Z-coordinates (also referred to as Z-heights) associated with the respective ROIs of a multi-region set. The set of images may be analyzed in each of the member ROIs to determine their respective Z-heights, for example, based on analyzing their respective focus curves according to known methods. In one method the shared set of workpiece images is analyzed to estimate a respective best focus Z-height for each respective member ROI by determining a respective focus curve for each respective member ROI of the first multi-region set of autofocus ROIs based on the shared set of workpiece images. Then, each respective best focus Z-height is determined based on the corresponding respective focus curve. For example, a respective best focus Z-height may be an interpolated Z-height corresponding to the peak of a respective focus curve. The respective focus curve may be a curve fit to a respective set of "focus metric" data points determined for a respective ROI in each image of the shared set of images. Various techniques usable in conjunction with this invention for the acquisition of such a set of images, and the determination and analysis of focus curves, are taught in U.S. Pat. No. 6,542,180, which is hereby incorporated herein by reference in its entirety. The shared set of images may be acquired during continuous motion over the Z-height search range. In the embodiment shown in FIG. 4B, the user may accept and/or select that a default search range be determined and used, or that the search range be based on a nominal (or range midpoint) value entered by the user, or that the search range be based on maximum and minimum values entered by the user.

In one embodiment, the nominal, and/or maximum and minimum values entered by the user are values specific to the currently selected member ROI. For example, the nominal value may be the expected Z-height value for the selected ROI, and the maximum and minimum values may correspond to the ends of its fabrication tolerance range. In such an embodiment, the multi-region autofocus tool operates to analyze the set of such values corresponding to the set of member ROIs, and to determine a search range such that it includes all the values in the set.

In another embodiment, the nominal, and/or maximum and minimum values entered by the user are global values that are applied to the entire multi-region set. In such an embodiment, a value may be altered for all members of a multi-region set whenever it is altered for one of the members. For example, the nominal value may be an average or approximate Z-height value expected for the member ROIs, and/or the maximum and minimum values may define a search range that the user expects will include all the respective Z-heights of the member ROIs.

In various embodiments, the multi-region autofocus tool may determine a default search range based on operations during manual mode and/or learn mode set-up of the tool. In various embodiments, the default search range may be determined based on the Z-height position(s) used while graphically defining a multi-region set of autofocus ROIs. In such embodiments, it may be preferred that at least one of the ROIs is in focus when defining the ROIs graphically as outlined above. The corresponding Z-height may then be used in establishing the default Z-height search range (e.g., as its midpoint). In one embodiment, if different Z-height positions are used when various member ROIs are defined, the multi-region autofocus tool may assume that the different Z-heights are each useful focus heights, and the default Z-height search range may be automatically defined such that each of the different Z-height positions is included within the search range.

In any case above where the search range is not completely defined by user input, multi-region autofocus tool operations may determine the Z-height search range based on the current machine optical configuration (e.g., the current depth of field or magnification), and/or workpiece information (e.g., expected surface height variations due to fixturing or fabrication variations, or the like) in order to provide an efficient search range that also includes enough range to allow for robust operation with reasonable variations in the ROI Z-heights during measurement and/or part program execution.

FIG. 4C illustrates tabbed portion 410c, which reflects the type of measurement data the tool provides for the multi-region set that includes the selected ROI. In various embodiments, the measurement data type may be altered for all members of a multi-region set whenever it is altered for one of the members. The embodiment shown in FIG. 4C, allows the user to select one of three measurement data types. The Multipoint All data type nominally provides a Z-height value for each member ROI of the multi-region set. The user of the machine vision inspection system may then select one (or more) of the provided Z-height values (e.g., in a part program), and adjust the machine to a Z-position that matches that Z-height value as a means of focusing the inspection system at a desired height, or they may simply select any or all of the Z-height values to be output as measurement values. In various embodiments this may be the default data type. This is useful, for example, so that the Z-height position of the inspection system may be adjusted to the respective Z-height value (e.g., to provide a focused image usable for further inspection operations) of any of the member ROIs, after the multi-region autofocus tool is run. The Multipoint Max and Multipoint Min data types provide the maximum or minimum Z-height value, respectively, among a set of Z-height values determined for all member ROIs. In various embodiments, the multi-region autofocus tool automatically adjusts the Z-height position of the inspection system to match the maximum or minimum provided Z-height, or an average Z-height, or the like.

For all the tabbed portions 410a-410c, the Defaults button at the bottom restores the entries on the tabbed portions 410b and 410c to their default values, the OK button accepts the current parameters and closes the autofocus parameter dialog box 400, and the Cancel button returns all parameters to their state before the current editing sequence began and closes the dialog box 400.

Figure 5A:
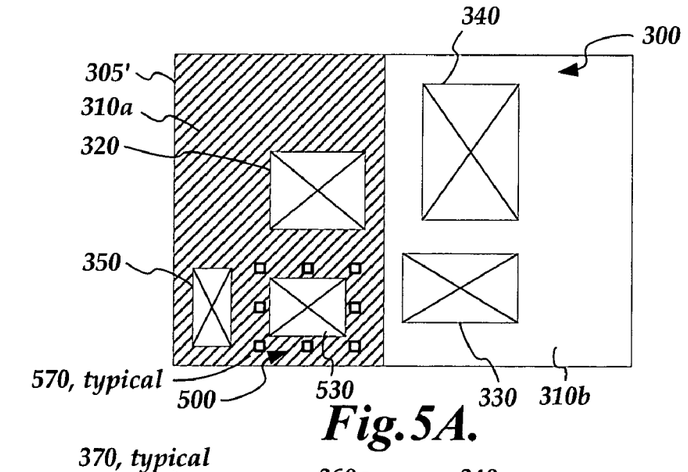
FIGS. 5A-5D are diagrams illustrating various features of one embodiment of a multi-region autofocus tool user interface including a field of view display and a mode selection and display bar.

FIGS. 5A-5D are diagrams illustrating various features of one embodiment of the previously described multi-region autofocus tool user interface 300 according to this invention, and an individual autofocus tool user interface 500. FIG. 5A shows the FOV 305' including two workpiece surfaces 310a and 310b, and the member ROIs 320-350 previously described with reference to FIGS. 3A-3D. FIG. 5A also shows an individual autofocus tool user interface 500, including an individual autofocus ROI 530, that was defined while the individual autofocus tool mode was active. The individual autofocus tool user interface 500 may operate according to known methods in commercial systems and/or as described herein. In FIG. 5A, the user interface completed individual autofocus ROI 530 has been selected for editing. Similarly to the previously described editing features of the selected member ROI 320 shown in FIG. 3D, when the ROI 530 is selected for editing, a set of size/location editing handles 570 may be displayed along the corners and sides, as shown for the selected ROI 530. An individual autofocus parameter dialog box (not shown), similar to the previously described tabbed portions 410a and 410b, for example, may also be displayed.

Figure 5B:
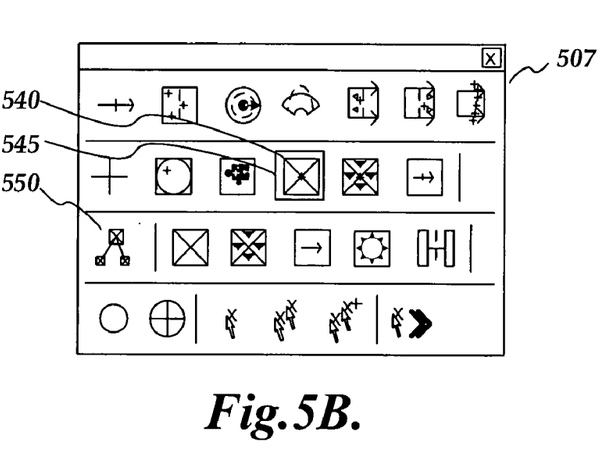

FIG. 5B illustrates one embodiment of a tool selection bar 507, including a surface autofocus tool-type activation button 540 and a multi-region autofocus tool/mode (activation/deactivation) button 550. FIG. 5B shows a user interface configuration wherein the tool selection bar 507 indicates that an autofocus tool-type is active via an "active" box 545 around the autofocus tool-type button 540, and the multi-region autofocus tool/mode button 550 is set to inactive (there is no "active" box around the multi-region autofocus tool/mode button 550). This indicates that the current autofocus tool mode is the individual autofocus tool mode. In various embodiments, if the user were to "press" the multi-region autofocus tool/mode button 550, the multi-region autofocus tool mode would become active and the operations and display elements associated with editing the individual ROI 530 (shown in FIG. 5A), and the individual autofocus tool mode, would be disabled. In some embodiments, the state of the tool selection bar 507 in FIG. 5B may corresponds to the state of the user interface displayed in FIG. 5A, in that when the individual autofocus ROI 530 is selected, the multi-region autofocus tool/mode button 550 may become inactive, regardless of its previous state. This may also be the case when the ROI of any tool other than a multi-region tool is selected in the FOV 305'.

Figure 5C:
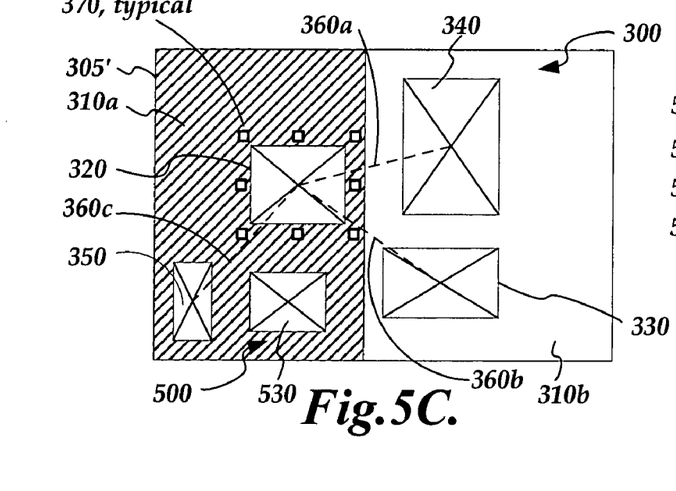
Figure 5D:
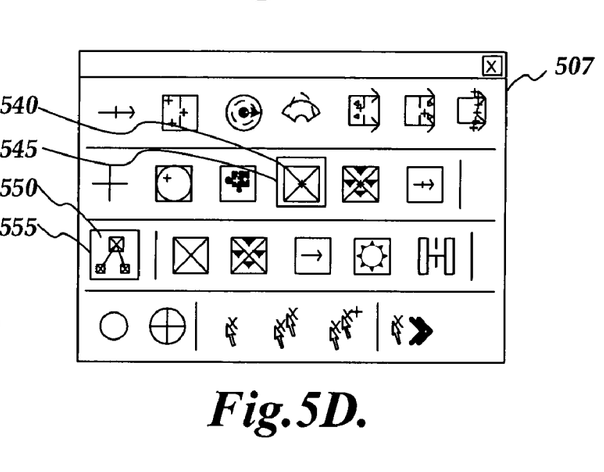

FIG. 5C illustrates a state of the user interface after the user has selected the member ROI 320 of the multi-region set for editing. The associated user interface features are similar to those described with reference to FIG. 3D. The state of the tool selection bar 507 in FIG. 5D may correspond to the state of the user interface displayed in FIG. 5C. For example, because the multi-region member ROI 320 has been selected for editing, in FIG. 5D the tool selection bar 507 may set the multi-region autofocus tool/mode button 550 to active (as indicated by the surrounding "active" box 555), regardless of its previous state. In various embodiments, if the user were to "press" the multi-region autofocus tool/mode button 550 to toggle it "off" or inactive, the individual autofocus tool mode would become active and the operations and display elements associated with editing the multi-region member ROI 520 (in FIG. 5C), and the multi-region autofocus tool mode, would be disabled. In various embodiments, if the multi-region autofocus tool/mode button 550 is toggled "on," either directly or due to the selection of a member ROI of a multi-region set in the FOV 305', then various tool buttons in the tool selection bar 507 may be "grayed out" or the like, to indicate that they are incompatible with the multi-region autofocus tool mode.

It should be appreciated that although the individual autofocus ROI 530 is shown not to overlap with any of the multi-region member ROIs 320-350 in the example shown in FIGS. 5A-5D, more generally, in various embodiments, any autofocus ROI defined in any mode may overlap any other ROI, and the various features described previously may be unchanged.

In the previously described embodiment, the multi-region autofocus tool-type may be provided by activating a combination of an autofocus video tool-type button or icon and a multi-region autofocus tool/mode button or icon. The individual autofocus tool-type may be provided by activating an autofocus video tool-type button or icon without activating the multi-region autofocus tool/mode button or icon. However, in various other embodiments, a multi-region autofocus tool-type may be provided by activating a first "single" button that provides the multi-region autofocus tool-type directly, and the individual autofocus tool-type may be provided by activating a second "single" button that provides individual autofocus tool-type directly. That is, no "mode" button would be required.

Figure 6:
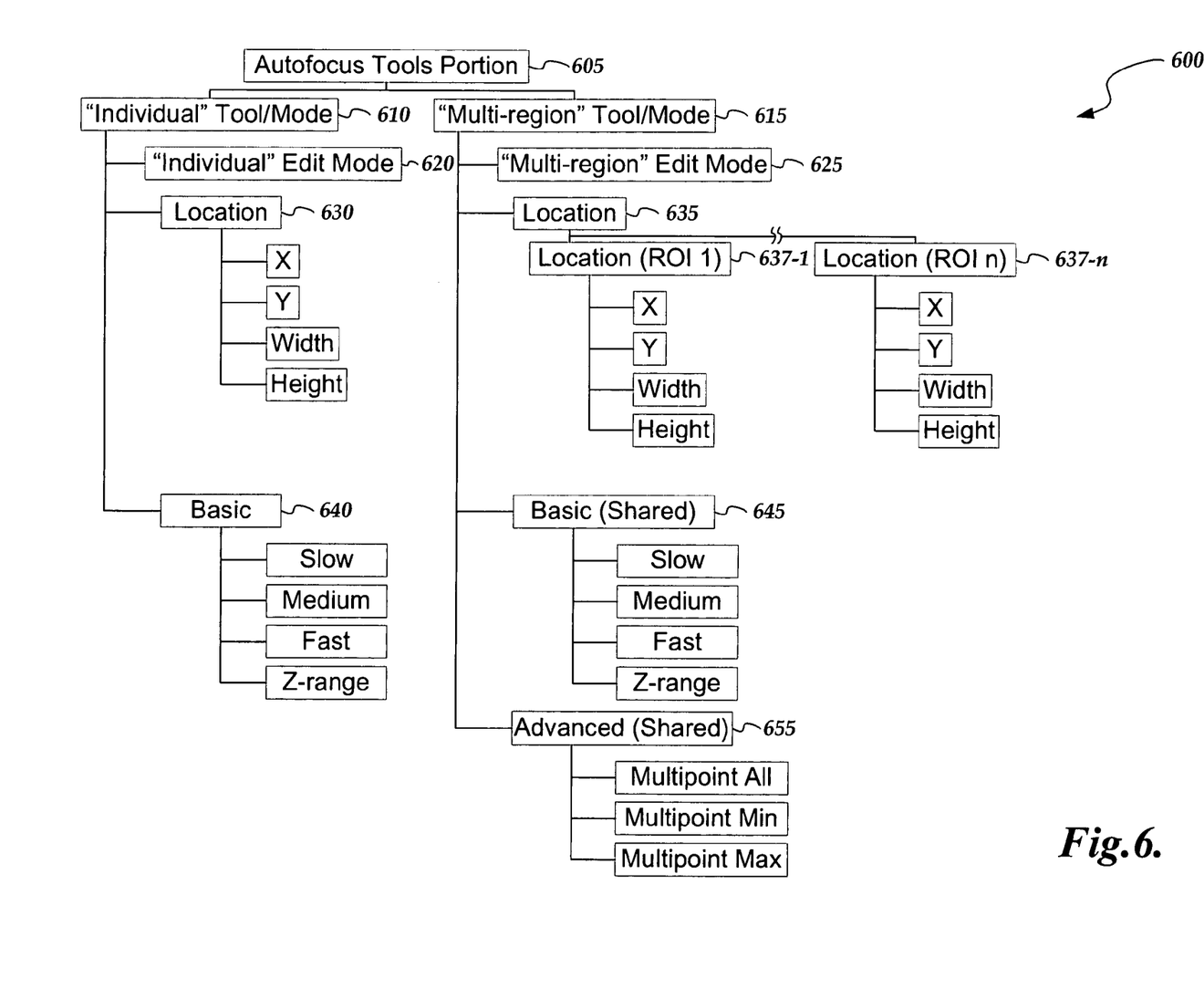
FIG. 6 is a block diagram illustrating various features and operating parameters associated with individual autofocus tool and multi-region autofocus tool modes of operation.

FIG. 6 is a block diagram 600 illustrating various features and operating parameters associated with individual autofocus tool and multi-region autofocus tools and/or modes of operation. The various features and operating parameters may be implemented in hardware and/or software by any now-known or later-developed method. An autofocus tools portion 605 of a machine vision inspection system may comprise an individual autofocus tool/mode 610 usable to define autofocus ROIs having independent autofocus parameters, and a multi-region autofocus tool/mode 615 usable to define autofocus ROIs having autofocus parameters in common, and which may have their Z-heights determined from a single shared set of autofocus images. In the embodiment shown in FIG. 6, for each multi-region set of ROIs, the related multi-region autofocus tool parameters comprise location parameters 635, "basic" shared autofocus parameters 645, and "advanced" shared measurement data type parameters 655. The features of one exemplary embodiment of the parameters and user interfaces corresponding to the elements 635, 645, and 655 have been previously described with reference to FIGS. 4A-4C. The location parameters 635 include the various ROI parameter groups 637-1 through 637-$n$, corresponding to the member ROIs "1 through n" included in that multi-region set. The member ROIs ("ROI1" through "ROIn") each have respective ROI location parameters It will be appreciated based on previous description, that in one embodiment, each location may also include a location-specific Z-range parameter (not shown) for individual member ROIs, which may be used to automatically determine a "master" Z-range for the multi-region autofocus tool. The master Z-range may be the shared "Z-range" parameter of the "basic (shared)" element 645, which may be used to acquire the shared set of autofocus images for the multi-region set. The multi-region autofocus tool/mode 615 also includes a multi-region autofocus tool editing mode interface and operations 625, which may operate as previously outlined.

In the embodiment shown in FIG. 6, for each individual autofocus ROI, the related autofocus tool parameters comprise location parameters 630, and "basic" autofocus parameters 640. The features of the parameters and user interfaces corresponding to the elements 630 and 640 may be analogous to those of the elements 637-1 and 645, respectively. The individual autofocus tool/mode 610 also includes an individual autofocus tool editing mode interface and operations 620, which may operate in a manner analogous to the multi-region editing element 625. Other individual autofocus parameters, edit mode features, and/or user interfaces may be implemented based on the known individual autofocus tools used in commercially available systems, if desired.

Figure 7:
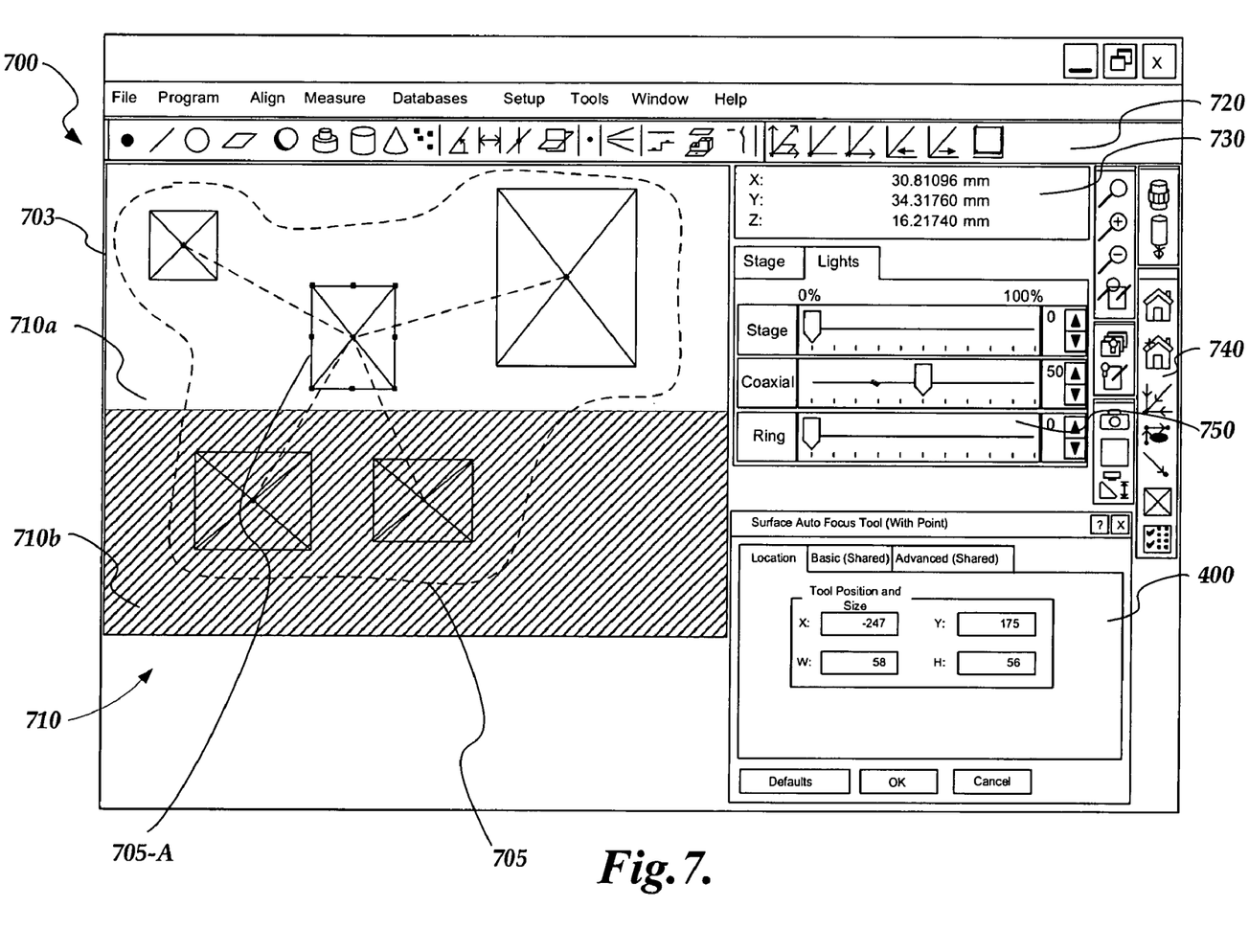
FIG. 7 is a diagram illustrating of one embodiment of a machine vision inspection system user interface display including various features associated with a multi-region autofocus tool.

FIG. 7 is a diagram illustrating one embodiment of a machine vision inspection system user interface display 700 including an arrangement of various features associated with a multi-region autofocus tool. In the exemplary state shown in FIG. 7, the user interface display 700 includes a field of view window 703 that displays a workpiece image 710 that includes two surfaces 710$a$ and 710$b$. The user interface 700 also include various measurement and/or operation selection bars such as the selection bars 720 and 740, a real-time X-Y-Z (position) coordinate window 730, and a light control window 750.

The field of view window 703 includes an exemplary multi-region set of ROIs 705 superimposed upon the workpiece image 710, including a member ROI 705-A that has been selected by a user for editing, as previously described. In various embodiments, when the user selects a multi-region autofocus ROI for editing, the user interface may automatically display an autofocus parameter dialog box, such as the previously described parameter dialog box 400 as shown in FIG. 7, or an analogous dialog box if an individual autofocus ROI is selected.

While exemplary user interface features and sequences of operations have been outlined when describing various exemplary embodiments of autofocus tools with reference to FIGS. 3-7, it will be appreciated that in other exemplary embodiments certain operations may be performed in other sequences and/or one or more of the described operating features or GUI features may be omitted, and the other inventive aspects of the methods and GUI's disclosed herein may still provide substantial benefits. Thus, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for operating a multi-region autofocus video tool-type in a machine vision inspection system, wherein:

the multi-region autofocus video tool-type comprises a multi-region autofocus video tool graphical user interface (GUI) including at least one element that indicates when a multi-region autofocus video tool-type is the active tool-type, at least one element that allows a user to activate and deactivate the multi-region autofocus video tool-type, and autofocus region of interest (ROI) indicating elements that may be configured by a user to define a plurality of autofocus ROIs; and the multi-region autofocus video tool-type is included in a machine vision inspection system, the machine vision inspection system comprising a camera portion configured to provide a workpiece image, a control system portion that includes the multi-region autofocus video tool, and a display portion configured to display a field of view of a workpiece image and the autofocus region of interest (ROI) indicating elements of the multi-region autofocus video tool GUI overlaying the workpiece image, the method comprising:

(a) displaying the multi-region autofocus video tool GUI including at least a cursor configured to be positioned over a workpiece image, after a user activates a multi-region autofocus video tool, wherein the user may position the cursor at a desired position on the workpiece image;

(b) in response to the user configuring a first autofocus ROI indicating element to define a first autofocus ROI while the multi-region autofocus video tool is active, storing the parameters of the first autofocus ROI as the ROI parameters of a first member of a first multi-region set of autofocus ROIs;

(c) in response to the user configuring a plurality of additional autofocus ROI indicating elements to define a plurality of additional autofocus ROIs while the multi-region autofocus video tool remains active, automatically storing the parameters of each respective additional autofocus ROI as the ROI parameters of a respective additional member of the first multi-region set of autofocus ROIs;

(d) determining a shared Z-height search range to be associated with the first multi-region set of autofocus ROIs; and (e) when the autofocus operations of the multi-region autofocus video tool are run, performing operations comprising:

(i) acquiring a shared set of workpiece images at a plurality of Z-positions distributed along the shared Z-height search range; and (ii) analyzing the shared set of workpiece images to estimate a respective best focus Z-height for each respective member ROI of the first multi-region set of autofocus ROIs.

2. The method of claim 1, the method further comprising: displaying an indication of the member ROIs of the first multi-region set of autofocus ROIs superimposed on the displayed field of view, after automatically storing the parameters of at least two ROIs as the parameters of as members of the first multi-region set of autofocus ROIs.

3. The method of claim 2, wherein, the indication of the member ROIs of the first multi-region set of autofocus ROIs is displayed during at least one of:

a) while defining the members of the first multi-region set of autofocus ROIs;

b) when creating a new member of the first multi-region set of autofocus ROIs;

c) after selecting an ROI of a previously defined member of the multi-region set of autofocus ROIs; and d) when editing a member of the first respective multi-region set.

4. The method of claim 2, wherein the indication of the member ROIs comprises one of:

a) displaying at least one line connecting at least two member ROIs of the first multi-region set of autofocus ROIs, b) displaying at least two member ROIs of the first multi-region set of autofocus ROIs using a similar color, c) displaying at least two member ROIs of the first multi-region set of autofocus ROIs using a similar line type, d) displaying a boundary line around the members of the first multi-region set of autofocus ROIs; and e) displaying an alphanumeric designator proximate to the members of the first multi-region set of autofocus ROIs.

5. The method of claim 1, the method further comprising:

activating the multi-region autofocus video tool to be the current video tool during a first time period;

defining and storing the parameters of at least a first member ROI and a second member ROI of the first multi-region set of autofocus ROIs during the first time period;

deactivating the multi-region autofocus video tool and performing an operation unrelated to the first multi-region set of autofocus ROIs during a second time period;

reactivating the multi-region autofocus video tool to be the current video tool during a third time period; and defining and storing the parameters of at least a third member ROI of the first multi-region set of autofocus ROIs during the third time period.

6. The method of claim 5, wherein:

reactivating the multi-region autofocus video tool to be the current video tool during the third time period comprises selecting a previously defined member of the multi-region set of autofocus ROIs; and defining and storing the parameters of the at least a third member ROI of the first multi-region set of autofocus ROIs during the third time period comprises configuring an autofocus ROI indicating element to define the at least a third member ROI.

7. The method of claim 6, wherein:

selecting the previously defined member ROI of the multi-region set of autofocus ROIs comprises positioning the cursor in the ROI of the previously defined member and depressing a button on a user input device; and configuring an autofocus ROI indicating element to define the at least a third member ROI comprises placing a point at a location in the displayed field of view as the next user input operation following depressing the button to select the previously defined member ROI, wherein the placed point defines a corner of the autofocus ROI of the third member ROI.

8. The method of claim 5, wherein deactivating the multi-region autofocus video tool comprises at least one of a) activating a type of video tool that is not a multi-region autofocus type video tool and b) selecting video tool that is not a multi-region autofocus video tool.

9. The method of claim 5, wherein:

the at least one element that allows a user to activate and deactivate the multi-region autofocus video tool-type comprises a multi-region autofocus tool/mode activation button that is operable to activate and deactivate a multi-region autofocus video tool mode;

the multi-region autofocus video tool GUI includes at least one autofocus video tool-type button that is not the multi-region autofocus tool/mode activation button, and that autofocus video tool-type button is operational to select an autofocus type of video tool;

when that autofocus video tool-type is selected and the multi-region autofocus video tool mode is activated, then the selected autofocus video tool-type operates in a multi-region autofocus tool mode; and when that autofocus video tool-type is selected and the multi-region autofocus video tool mode is deactivated, then the selected autofocus video tool-type operates in an individual-region autofocus tool mode.

10. The method of claim 9, wherein:
deactivating the multi-region autofocus video tool comprises operating the multi-region autofocus tool/mode activation button to make a currently selected autofocus video tool-type operate in an individual-region autofocus tool mode;
the operation performed during the second time period comprises defining an individual autofocus ROI using that individual autofocus video tool-type.

11. The method of claim 10, wherein the individual autofocus ROI overlaps with at least one of the previously defined member ROIs of the first multi-region set of autofocus ROIs.

12. The method of claim 1, wherein:
the at least one element that allows a user to activate and deactivate the multi-region autofocus video tool-type comprises a multi-region autofocus tool/mode activation button that is operational to activate and deactivate a multi-region autofocus video tool mode;
the multi-region autofocus video tool GUI includes at least one autofocus video tool-type button that is not the multi-region autofocus tool/mode activation button, and that autofocus video tool-type button is operational to select an autofocus type of video tool;
when that autofocus video tool-type is selected and the multi-region autofocus video tool mode is activated, then the selected autofocus video tool-type operates in a multi-region autofocus tool mode; and
when that autofocus video tool-type is selected and the multi-region autofocus video tool mode is deactivated, then the selected autofocus video tool-type operates in an individual-region autofocus tool mode.

13. The method of claim 12, wherein the at least one element that indicates when a multi-region autofocus video tool-type is the active tool-type and the at least one element that allows a user to activate and deactivate the multi-region autofocus video tool-type comprise the same element.

14. The method of claim 1, wherein the multi-region autofocus video tool GUI includes a multi-region autofocus parameter dialog box that is operational for the user to determine a multi-region autofocus operation parameter that at least partially determines at least one of a) an autofocus accuracy level and b) a Z-axis spacing that is provided between the shared set of workpiece images when the autofocus operations of the multi-region autofocus video tool are run; and
the method further comprises:
displaying the multi-region autofocus parameter dialog box; and
the user determining the multi-region autofocus operation parameter using the displayed the multi-region autofocus parameter dialog box.

15. The method of claim 1, wherein determining the shared Z-height search range comprises one of:
a) using a default Z-height search range;
b) using a default Z-height search range that depends on a current optical configuration;
c) using a Z-height search range defined by the user; and
d) using a Z-height search range determined based on a plurality of ROI focus positions established while defining the first multi-region set of autofocus ROIs.

16. The method of claim 1, wherein analyzing the shared set of workpiece images to estimate a respective best focus Z-height for each respective member ROI of the first multi-region set of autofocus ROIs comprises determining a respective focus curve for each respective member ROI of the first multi-region set of autofocus ROIs, based on the shared set of workpiece images, and determining each respective best focus Z-height based on the corresponding respective focus curve.

17. The method of claim 1, wherein the user configures each of the autofocus ROI indicating elements independently such that each of the member ROIs of the first multi-region set of autofocus ROIs are independently defined with respect to their size and location.

18. The method of claim 17, wherein at least two member ROIs of the first multi-region set of autofocus ROIs at least partially overlap.

19. The method of claim 17, wherein at least one of a) a set of image acquisition parameters used for acquiring the shared set of images, b) an autofocus accuracy level parameter that governs the determination of respective Z-heights corresponding respective member ROIs, c) a Z-axis spacing that is provided between the shared set of workpiece images when the autofocus operations of the multi-region autofocus video tool are run, and d) a shared Z-height search range, is shared by each member ROI of the first multi-region set of autofocus ROIs.

* * * * *

UNITED STATES PATENT AND TRADEMARK OFFICE
CERTIFICATE OF CORRECTION

PATENT NO. : 7,570,795 B2  Page 1 of 1
APPLICATION NO. : 11/489030
DATED : August 4, 2009
INVENTOR(S) : D. Yu et al.

It is certified that error appears in the above-identified patent and that said Letters Patent is hereby corrected as shown below:

| COLUMN | LINE | ERROR |
|---|---|---|
| 15 (Claim 2, | 52 line 5) | "the parameters of as" should read --the parameters of-- |
| 16 (Claim 4, | 2 line 4) | delete "," and insert --;-- |
| 16 (Claim 4, | 4 line 6) | delete "," and insert --;-- |
| 16 (Claim 4, | 6 line 8) | delete "," and insert --;-- |
| 16 (Claim 8, | 51 line 4) | "b) selecting video" should read --b) selecting a video-- |
| 18 (Claim 14, | 8 line 14) | "displayed the multi-region" should read --displayed multi-region-- |
| 18 (Claim 19, | 51 lines 39-40) | "corresponding respective member" should read --corresponding to respective member-- |

Signed and Sealed this

Sixth Day of April, 2010

David J. Kappos
*Director of the United States Patent and Trademark Office*